(12) United States Patent
Steurer (10) Patent No.: US 9,007,443 B2
(45) Date of Patent: *Apr. 14, 2015

(54) CAMERA OBJECTIVE AND CAMERA SYSTEM

(71) Applicant: Arnold & Richter Cine Technik GmbH & Co. Betriebs KG, Munich (DE)

(72) Inventor: Johannes Steurer, Landshut (DE)

(73) Assignee: Arnold & Richter Cine Technik GmbH & Co. Betriebs KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/153,201

(22) Filed: Jan. 13, 2014

(65) Prior Publication Data

US 2014/0126044 A1  May 8, 2014

Related U.S. Application Data

(63) Continuation of application No. 13/154,573, filed on Jun. 7, 2011, now Pat. No. 8,670,024.

(30) Foreign Application Priority Data

Jun. 10, 2010  (DE) .................. 10 2010 023 344

(51) Int. Cl.
   *H04N 13/02* (2006.01)
   *H04N 5/225* (2006.01)
   (Continued)

(52) U.S. Cl.
   CPC ........ *G02B 5/22* (2013.01); *G03B 11/04* (2013.01); *G03B 35/08* (2013.01); *G06T 7/0069* (2013.01);
   (Continued)

(58) Field of Classification Search
   None
   See application file for complete search history.

(56) References Cited

U.S. PATENT DOCUMENTS

| 5,168,327 A | 12/1992 | Yamawaki |
| 7,391,456 B2 | 6/2008 | Kandleinsberger et al. |

(Continued)

FOREIGN PATENT DOCUMENTS

| CN | 101 241 173 A | 2/2007 |
| DE | 60 05 823 T2 | 8/2000 |

(Continued)

OTHER PUBLICATIONS

Translation of German Search Report dated Jul. 11, 2011 relating to DE 10 2010 023 344.7.

(Continued)

*Primary Examiner* — Sath V Perungavoor
*Assistant Examiner* — Nam Pham
(74) *Attorney, Agent, or Firm* — Gifford, Krass, Sprinkle, Anderson & Citkowski, P.C.

(57) ABSTRACT

A camera objective for a camera includes a mask having a plurality of masking sections which are permeable for radiation of a first spectral range and are impermeable for radiation of a second spectral range different from the first spectral range. A camera system includes a digital camera for taking images. The camera system includes such a camera objective and an optoelectronic sensor arrangement having a plurality of sensor elements for generating exposure-dependent received signals which form a respective image. The plurality of sensor elements includes a first group of sensor elements for generating received signals in dependence only on radiation of the first spectral range and a second group of sensor elements for generating received signals in dependence on radiation of the second spectral range.

7 Claims, 5 Drawing Sheets

(51) Int. Cl.
*H04N 9/09* (2006.01)
*H04N 9/097* (2006.01)
*G02B 3/00* (2006.01)
*F21V 9/06* (2006.01)
*G02B 5/20* (2006.01)
*G03B 9/02* (2006.01)
*G02B 5/22* (2006.01)
*G03B 11/04* (2006.01)
*G03B 35/08* (2006.01)
*G06T 7/00* (2006.01)
*H04N 5/33* (2006.01)
*H04N 9/04* (2006.01)

(52) U.S. Cl.
CPC ............... *H04N 5/332* (2013.01); *H04N 9/045* (2013.01); *H04N 13/0207* (2013.01); *H04N 13/0271* (2013.01); *G02B 5/208* (2013.01); *G06T 2207/10004* (2013.01)

(56) References Cited

U.S. PATENT DOCUMENTS

| | | |
|---|---|---|
| 2006/0092314 A1 | 5/2006 | Silverstein et al. |
| 2008/0187305 A1 | 8/2008 | Raskar et al. |
| 2008/0259354 A1 | 10/2008 | Gharib et al. |
| 2009/0028451 A1 | 1/2009 | Slinger et al. |
| 2009/0095912 A1 | 4/2009 | Slinger et al. |
| 2010/0066854 A1 | 3/2010 | Mather et al. |
| 2010/0118142 A1 | 5/2010 | Ohsawa |
| 2010/0315490 A1* | 12/2010 | Kim et al. ........................ 348/47 |

FOREIGN PATENT DOCUMENTS

| | | |
|---|---|---|
| DE | 102 10 327 A1 | 9/2003 |
| DE | 601 05 823 T2 | 11/2004 |
| DE | 10 2004 016224 A1 | 10/2005 |
| DE | 603 05 022 T2 | 11/2006 |
| EP | 1 956 410 A2 | 8/2008 |
| WO | 2005/083506 A1 | 9/2005 |
| WO | 2006/078537 A2 | 7/2006 |
| WO | 2007/047732 A2 | 4/2007 |

OTHER PUBLICATIONS

Levin et al., Image of Depth from a Conventional camera with a Coded Aperture. Massachusetts Institute of Technology, Computer Science and Artificial Intelligence Laboratory.

European Search Report dated Aug. 18, 2011. EP 11004623.2.

* cited by examiner

CAMERA OBJECTIVE AND CAMERA SYSTEM

CROSS-REFERENCE TO RELATED APPLICATIONS

This application is a continuation of U.S. patent application Ser. No. 13/154,573 filed Jun. 7, 2011, which claims priority of German Patent Application DE 10 2010 023 344.7 filed Jun. 10, 2010.

FIELD OF THE INVENTION

The present invention relates to a camera objective for a camera having a mask comprising a plurality of masking sections. The invention further relates to a camera system having a digital camera, in particular a digital motion picture camera, for taking images.

BACKGROUND OF THE INVENTION

It is desirable both with still cameras and with moving image cameras also to acquire information on the depth of field or depth information of the motif taken in addition to the two-dimensional image information. The availability of depth information is sensible for various applications. Support for or automation of the focusing process of the objective and applications in the field of visual effects, which are produced digitally in postproduction with the aid of computers on the basis of real image data, can be named here by way of example. Examples for visual effects are the releasing of objects due to their distance from the taking camera and the spatially correct positioning of computer-generated objects in the real scene taken by means of the camera. The presence of a complete depth map for the respective image is desirable for such visual effects, i.e. depth information should be present for each picture element, where possible, so that the virtual object can be inserted into the real scene in a manner as close to reality as possible.

Different processes are generally known for the acquisition of depth information. An example for this is stereo triangulation in which, in addition to a main imaging beam path, a second beam path axially offset thereto and having a separate objective and image sensor is provided. Since the objective in the second beam path is independent of the objective in the main beam path, differences between the two objectives or also shadowing can in particular occur with respect to focusing or the picture angle. This impairs the accuracy of the triangulation calculation.

Further processes for acquiring depth information use structured lighting, with the scene to be taken being lit using a known pattern and being taken by a camera at an angle of view different from the lighting angle. Other processes are based on the principle of time-of-flight measurement in which the scene to be taken is lit by modulated light or is scanned by means of a laser beam.

In the paper "Image and Depth from a Conventional Camera with a Coded Aperture" by Levin et al., published in "ACM Transactions on Graphics", Vol. 26, Issue 3, 2007, whose disclosure is included in the subject matter of the present application, a method is described for the acquiring of depth information in which a so-called coded aperture is provided in the region of the objective used for the image taking. Such a coded aperture comprises a mask in which impermeable masking sections are arranged in a structured manner.

The basic principle of the method described in the aforesaid paper by Levin et al. is based on the effect that a lens or an objective only images a dot in the object space (corresponding to a dot-shaped "light source") as a dot in the picture plane when the dot is located in the focusing plane of the lens or of the objective. If the dot or the dot-shaped "light source" is, in contrast, located at a different distance from the lens or from the objective, the dot is imaged as blurred and a circle of confusion is generated in the image plane whose diameter is proportional to the distance of the light source from the focusing plane.

It is possible by a deconvolution of the taken images to subtract the blur caused by the depth-dependent defocusing described above out of the image, with information on the degree of blur and thus, as a consequence thereof, also on the distance of the taken objects simultaneously being able to be acquired. An optical imaging can namely basically be described as a convolution of a function describing the object to be described with a kernel, with the kernel describing the optical properties of the imaging element.

In the method according to Levin et al, the kernel is characterized inter alia by the structure of the coded aperture. Ultimately, the use of a coded aperture having a relatively complex structure in comparison with the circular or iris-type aperture usual with conventional objectives increases the accuracy in the calculation of the deconvolution or makes its calculation possible at all.

The demands on the structure of a coded aperture are described in more detail in the paper by Levin et al. They are satisfied by a structure such as the coded aperture or mask shown by way of example in FIG. 2 has. In this mask, transparent sections and masking sections non-permeable to radiation and shown hatched in FIG. 2 alternate.

On the taking of images while using coded apertures, however, the influencing of the figure of confusion, which is desired per se for the acquisition of the depth information, by objects not located in the focusing plane can result in esthetically unwanted effects. Light sources imaged in a blurred manner, in particular highlights, thus have unusual structures which are not circular, but are rather modulated by the structure of the mask. These effects can admittedly subsequently be calculated by calculation. However, these effects are disturbing at least during the taking on the use of an electronic viewfinder (direct reproduction of the taken image).

The aperture area or free opening of the objective is further reduced by the masking sections and its speed is thus decreased.

SUMMARY OF THE INVENTION

It is therefore the object of the invention to provide a camera objective and a camera system which are designed for determining the depth information by means of a coded aperture and which are improved with respect to the imaging quality and the speed.

The object of the invention is satisfied by a camera objective having a mask with a plurality of masking sections which are permeable for radiation of a first spectral range and are impermeable for radiation of a second spectral range different from the first spectral range.

Images of objects which reflect or emit electromagnetic radiation both in the first spectral range and in the second spectral range can be generated by this camera objective whose image portions located in the first spectral range are not influenced by the mask, whereas the radiation portions in the second spectral range are coded by means of the mask on the passage through the objective, as is required for an application of the method for acquiring the depth information described in the paper by Levin et al.

Finally, therefore, two mutually superimposed images are produced of which the image taken in the first spectral range is encoded and largely corresponds to an image generated using a conventional camera objective without a mask, whereas the image information of the image taken in the second spectral region is coded or convoluted by the structure of the mask so that the desired death information can be acquired therefrom in a subsequent calculation step.

The named mask is preferably arranged in the beam path in a plane perpendicular to the optical axis. The masking sections are permeable for electromagnetic radiation of the first spectral range (for example visible light), either completely or at least substantially (i.e. without absorption losses significantly impairing the image quality). For electromagnetic radiation of the second spectral range different from the first spectral range, however, the masking sections are absorbent and/or reflective and thus completely or substantially impermeable.

Since the mask for the first spectral range is more or less completely permeable, the speed of the camera objective is not influenced or is only insignificantly influenced for this spectral range. An esthetically unwanted influencing of the imaging quality is also avoided because also no convolution by the mask structure takes place in this spectral range. No noticeable impairment of the image quality thus takes place in the first spectral range. The image information acquired in the second spectral region in contrast allows the determination of depth information.

The depth information acquired from the coded image can be associated with the uncoded image in a suitable manner so that a depth map can, for example, be prepared therefrom. The association can take place by way of picture elements or for partial image regions, i.e. for groups of picture elements, depending on the resolution. A separation of the two superimposed images will be explained in more detail in the following. In accordance with an advantageous embodiment of the invention, the first spectral region is formed by at least one spectral range of visible radiation (i.e. light) and the second spectral region is formed by at least one spectral range of non-visible radiation, in particular infrared or ultraviolet radiation. The imaging in the region of the visible light is not impaired by the mask by this selection of the spectral ranges. The coding required for the application of the method according to Levin et al. only takes place in a spectral range not visible to the human eye.

In accordance with an alternative embodiment, the first spectral range and the second spectral range are formed by at least one respective spectral range of the visible radiation. This also allows the acquisition of depth information when, for example, infrared or ultraviolet radiation is not available in sufficient intensity. The first spectral range could, for example, only cover green light, whereas the second spectral range only covers red light. However, it must then be accepted that a partial range of the visible spectral range is coded by the mask. If this spectral range should be filtered out of the visual image due to the unwanted structuring, the taking of real-color images has to be dispensed with.

In accordance with a further advantageous embodiment, the mask is arranged between two main planes of the camera objective, in particular within a diaphragm of the objective or directly adjacent to a diaphragm of the objective. The integration of the mask in an existing camera objective design thus only requires small construction adaptations. It would, for example, also be possible to combine the diaphragm and the mask to one assembly.

In accordance with a further advantageous embodiment, the masking sections are formed in a self-supporting manner or on a carrier. With self-supporting masking sections, the introduction of additional boundary surfaces of a carrier into the beam path which impair the imaging quality of the objective is avoided. An arrangement of the masking sections on a carrier which is in particular transparent for both spectral ranges in contrast ensures a higher mechanical stability and allows greater freedoms in the design of the structure since there is no restriction to contiguous masking sections as with a self-supporting structure.

It is advantageous if a data memory is associated with the camera objective which is designed to store data which characterize the mask. It is thereby possible to store information on the mask provided in the objective in the actual objective and to associate this information with the images taken so that, on a later evaluation of the coded images, the correct mask structure can be used as the basis. Different masks can thus be used for different objectives, with the information on the actually used mask always being present.

It is furthermore advantageous if the camera objective is made to output a focusing value set at the camera objective. It is thereby possible to read information on the focusing value set at the objective from the actual objective and to associate this information with the taken images so that, on a later evaluation of the coded images, an absolute depth value can be calculated. The distance of the focusing plane from the camera set at the objective is called the focusing value, i.e. that distance of a light source from the camera in which this light source is in sharp focus. The method described by Levin initially only allows relative depth values to be determined which are normed to the focusing value set at the objective, i.e. the relative depth value is zero for a light source located in the focusing plane. If the (relative) depth value determined according to Levin's method and the focusing value are combined, in particular added, the absolute depth value, i.e. the actual distance of the light source from the camera, results from this. The output of the focusing value by the objective makes it possible to take this value into account on a later evaluation of the coded images.

The object of the invention is further satisfied by a camera system having a digital camera, in particular a digital motion picture camera, for taking images, wherein the camera includes a camera objective of the above-explained manner, i.e. having a mask with a plurality of masking sections which are permeable for radiation of a first spectral region and are impermeable for radiation of a second spectral range different from the first spectral range. The digital camera furthermore includes an optoelectronic sensor arrangement having a plurality of sensor elements for generating exposure-dependent received signals which form a respective image, wherein the plurality of sensor elements includes a first group of sensor elements for generating received signals in dependence on radiation of the first spectral range, but not of the second spectral range, and a second group of sensor elements for generating received signals in dependence on radiation of the second spectral range, but not of the first spectral range.

This means that the received signals generated by the sensor elements of the first group substantially only correspond to the radiation of the first spectral range (for which the masking sections of the mask are permeable) and that the received signals generated by the sensor elements of the second group substantially only correspond to the radiation of the second spectral range (for which the masking sections of the mask are impermeable). It is thereby possible to separate an uncoded image generated by the radiation of the first spectral range from an image generated by the radiation of the second spectral range and coded by means of the mask.

A separation of the radiation into the first spectral range and into the second spectral range can generally take place by at least one filter device which is provided between the camera objective and the sensor arrangement (e.g. a separate filter element) or directly at the sensor arrangement (e.g. a filter coating at the pixel level). Alternatively or additionally, a different inherent spectral sensitivity of the sensor elements used can also be utilized for a spectral separation of the radiation passing through the camera objective (for example, dependent on the semiconductor material used).

The sensor arrangement advantageously includes two separate sensors, with a first sensor including the sensor elements of the first group of sensor elements and a second sensor including the sensor elements of the second group of sensor elements. Two spatially separate sensors are therefore used here, which has the advantage that the sensors can be optimized with respect to their sensitivity for the respective spectral range to be detected. The one of the two sensors is preferably arranged on the main optical axis of the camera system, i.e. on the optical axis of the camera objective, whereas the other of the two sensors is arranged on an axis which is aligned, for example, perpendicular to the main optical axis.

In such an embodiment having two separate sensors, a beam splitter is preferably arranged between the camera objective and the two sensors and is designed to direct one portion of radiation passing through the camera objective to one of the two sensors and to direct another portion of the radiation passing through the camera objective to the other of the two sensors, in particular in a permanent division or in time multiplex. Optionally, the beam splitter can simultaneously carry out the named separation of the radiation into the first spectral range and into the second spectral range, i.e. the beam splitter can be effective in a wavelength selective manner. In this case, the beam splitter directs radiation of the first spectral range substantially only onto the first sensor and/or radiation of the second spectral range substantially only onto the second sensor.

A beam splitter mirror or a so-called beam splitter cube which, for example, comprises mutually bonded prisms, can, for example, be used as a permanently active beam splitter. Such a permanently active beam splitter preferably includes a filter device which is permeable for the radiation of the one of the two spectral regions and reflects the radiation of the other of the two spectral ranges. Alternatively to this, a rotating mirror shutter can be used as a beam splitter active in time multiplex whose axis of rotation is aligned obliquely to the main optical axis of the camera system and which has at least one transmitting sector and one reflective sector so that the two sensors are exposed alternately in dependence on the angular position of the rotating mirror shutter. The rotating mirror shutter is preferably active in substantially the same way with respect to the two spectral ranges, i.e. the portions of the radiation directed in the direction of the one sensor and of the other sensor are substantially the same for the two spectral regions without a special filter device being provided at the rotating mirror shutter. A separation of the radiation into the first spectral range and into the second spectral range in this case takes place by a subsequent filter device and/or by a different inherent spectral sensitivity of the two sensors.

In accordance with an alternative embodiment, the sensor arrangement includes a single sensor which includes the sensor elements of the first and second groups, with the first group of sensor elements substantially only being sensitive in the first spectral range and the second group of sensor elements substantially only being sensitive in the second spectral range (due to a suitable filter device and/or due to a different inherent spectral sensitivity). Such a sensor can, for example, be made in the manner of a Bayer sensor. In conventional Bayer sensors, a color filter for one of the primary colors red, green or blue is provided on each sensor element in a regular, matrix-type structure. 50% of the sensor elements are usually sensitive for green, whereas 25% each of the sensor elements are sensitive for red and blue. Such a Bayer sensor is now modified, for example, so that only 25% of the sensor elements are sensitive for green and the remaining 25% are sensitive in the infrared spectral range. The sensor elements having red, green and blue filters thus form the first group, whereas the sensor elements provided with infrared filters form the second group. Such a sensor has the advantage that the respective images of the two spectral ranges automatically have the required coverage accuracy. However, the infrared portion incident onto the sensor elements of the first group is not utilized, whereas conversely the portion in the visible spectral range incident onto the sensor elements of the second group is not utilized.

In accordance with an advantageous embodiment, the camera system furthermore has an evaluation unit which is made to determine a depth value for a respective picture element or a partial picture region on the basis of a blur of an image taken by the second group of sensor elements. The evaluation unit is accordingly designed in particular to carry out the method explained above for determining the depth values by Levin et al. and included here. The depths values in this respect correspond in each case to the distance of the camera from an object point and/or partial object region which is or are associated with the picture element or the partial picture region. The determined depth values can thus be used for the further processing of the image information which has been acquired with reference to the received signals of the first group of sensor elements.

In accordance with a further advantageous embodiment, the evaluation unit is connected or connectable to the aforesaid data memory of the camera objective to read out the data stored in the data memory which characterize the mask used and/or the evaluation device is designed to receive the aforesaid focusing value output by the camera objective. The evaluation device in further designed in these two cases additionally to determine the depth value on the basis of the data read out of the data memory and/or on the basis of the focusing value received by the camera objective. It is hereby ensured that the correct mask structure is always used as the basis for the determination by calculation of the depth values or a correct absolute depth value is calculated.

In accordance with a further advantageous embodiment, the camera system has a control device which is designed to read out the data stored in the aforesaid data memory of the camera objective (which characterize the mask used). The control device outputs these data together with the image data generated from the received signals to an output of the camera (e.g. to an external memory) or the control device causes the data read out of the data memory of the camera objective to be stored together with the image data in memory means of the camera system. It is hereby likewise ensured that the correct mask structure can always be used as the basis for the determination by calculation of the depth values even if this determination only takes place subsequently outside the camera system.

In accordance with a further advantageous embodiment, the camera system furthermore has a lighting apparatus for lighting objects to be taken with a spatially modulated, in particular a spatially periodically modulated lighting radiation of the second spectral range. The accuracy of the depth value determination can thereby in particular be improved with objects having only a small texture since an additional texture is imposed on the objects by a modulated or structured lighting.

BRIEF DESCRIPTION OF THE DRAWINGS

Further advantageous embodiments of the invention are set forth in the claims, in the description and in the drawings. The invention will be described in the following with reference to embodiments and to the drawing. Elements which are the same or of the same kind are marked by the same reference numerals therein. There are shown:

DETAILED DESCRIPTION OF THE PREFERRED EMBODIMENTS

Figure 1:
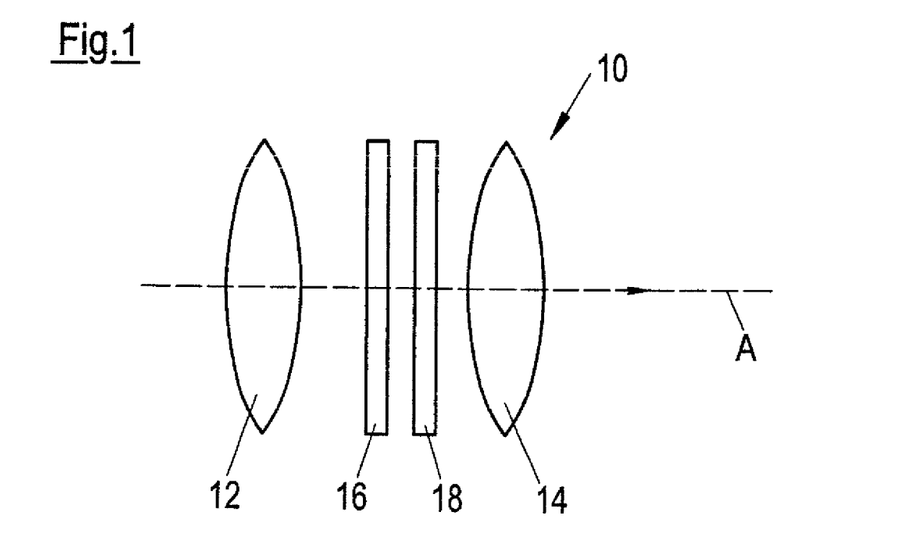
FIG. 1 a schematic representation of a camera objective in accordance with the invention.

FIG. 1 schematically shows a camera objective 10 in accordance with the invention which includes a front lens 12 and a rear lens 14 which are arranged on an optical axis A. A camera diaphragm 16 made as an iris diaphragm, for example, is arranged between the lenses 12, 14. A mask 18 is arranged directly behind the camera diaphragm 16 viewed in the direction of the imaging beam path. The camera objective 10 can naturally also include more or fewer than the two lenses 12, 14 shown. Generally, both the camera diaphragm 16 and the mask 18 can also be arrange at a different position in the camera objective 10. The camera diaphragm 16 and the mask 8 can in particular also be swapped over with one another.

Figure 2:
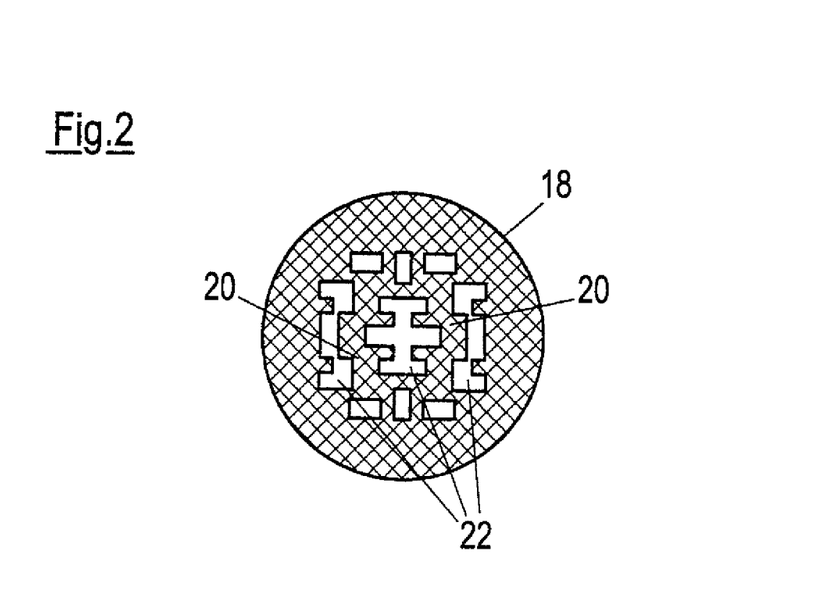
FIG. 2 a schematic representation of a mask of the camera objective of FIG. 1.

In accordance with FIG. 2, the mask 18 includes a structure of a plurality of masking sections 20 which are substantially permeable for radiation in the visible spectral range (i.e. for visible light), but not for radiation in a non-visible spectral range, for example in the infrared spectral range (i.e. for infrared radiation). In other words, the masking sections 20 are very largely absorbent and/or reflective in the infrared range. The mask furthermore has passage sections 22 which are complementary to the masking sections 20 and which are permeable both for the visible light and for the infrared radiation. The masking sections 20 can (as shown) be made in a self-supporting manner or can be arranged on a carrier (not shown). For example, the masking sections 20 can be formed by a dichroitic filter layer applied to a glass carrier.

Figure 3:
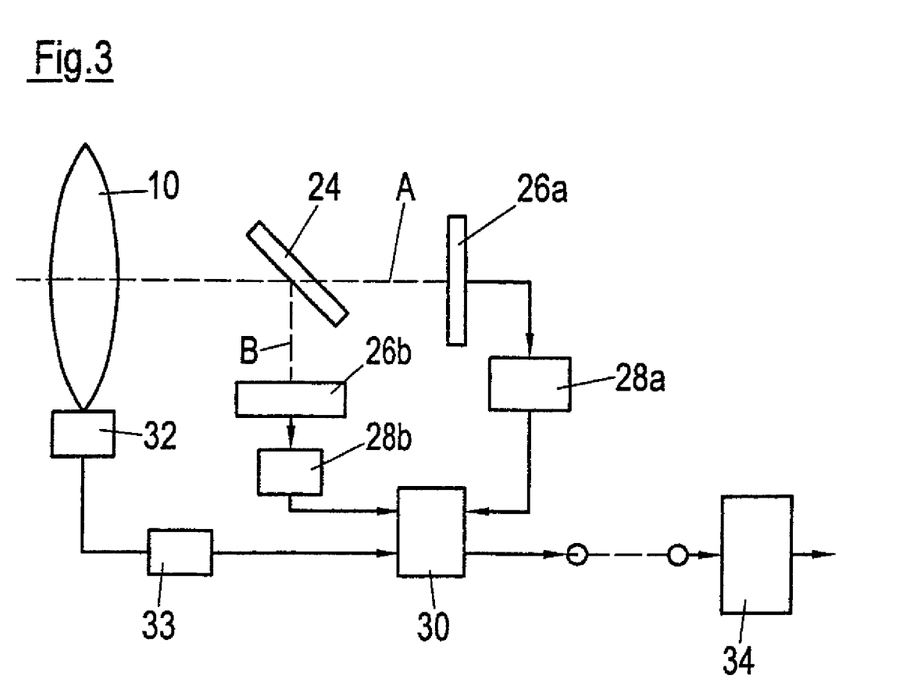
FIG. 3 a camera system in accordance with the invention in accordance with a first embodiment.

A camera system in accordance with the invention in accordance with a first embodiment includes, in accordance with FIG. 3, a camera objective 10 arranged on the optical axis A. A sensor 26a which is sensitive for visible light is likewise located on the optical axis. In this respect, it can, for example, be a conventional CMOS sensor which has sensor elements which are sensitive to red, green and blue light respectively due to a suitable filter coating.

A beam splitter 24 which permanently transmits the visible light to the sensor 26a, whereas the infrared radiation is permanently reflected in the direction of a sensor 26b, is provided at an angle of for example 45° to the optical axis A between the camera objective 10 and the sensor 26a. The sensor 26b is arranged on a secondary axis B perpendicular to the optical axis A, for example, and is, for example, a CMOS sensor sensitive for infrared radiation.

Figure 4:
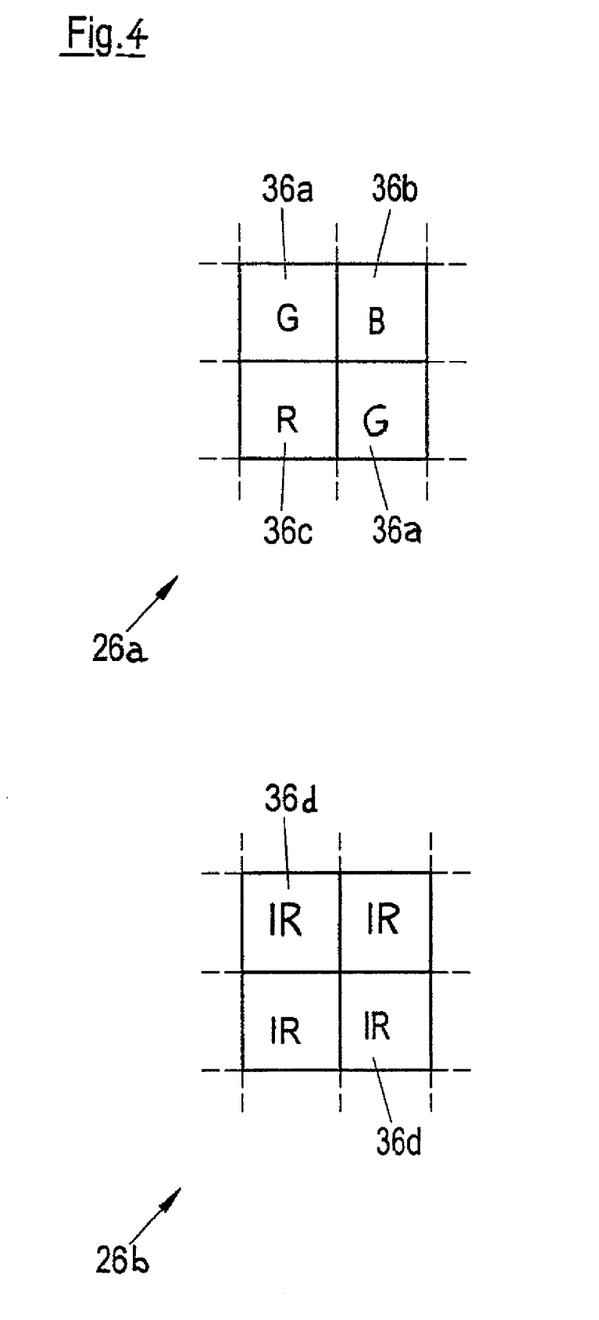
FIG. 4 a respective section of a schematic representation of the two sensors of the camera system in accordance with the first and second embodiments.

FIG. 4 shows a respective part section of the sensors 26a and 26b. The sensor 26a is provided with a Bayer color filter pattern, with a matrix of 2×2 sensor elements 36a to 36c periodically repeating over the surface of the sensor 26a. I.e. different color filters are applied to the sensor elements 36a to 36c so that the sensor element 36a is sensitive for green light, the sensor element 36b for blue light and the sensor element 36c for red light. An infrared blocking filter (not shown in FIGS. 3 and 4) can additionally be associated with the sensor 26a in dependence on the separation effect of the beam splitter 24 of spectrally different effect. FIG. 4 furthermore shows that all sensor elements 36d of the sensor 26b are substantially only sensitive for infrared radiation. This can be achieved by a corresponding selection of the semi-finished material used, i.e. the sensor 26b is inherently only sensitive for infrared radiation.

The beam splitter 24 in accordance with FIG. 3 is, for example, designed as a dichroitic short pass beam splitter mirror which transmits the visual light, whereas the infrared radiation of a longer wavelength is reflected in comparison thereto. Alternatively, a long pass beam splitter mirror can also be used in which the infrared radiation is transmitted and the visual light is reflected. In this case, the sensors 26a, 26b would have to be swapped over. Instead of a beam splitter mirror, a beam splitter cube composed of prisms or other suitable beam splitters can also be used.

The signals generated by the sensors 26a, 26b in dependence on the exposure are processed in a manner known per se in a respective signal processing unit 28a, 28b. The signal processing in particular includes a digitizing of the received signals. Images generated from the received signals are stored in the form of digital image data in an image memory 30 which can be designed either as an internal unit integrated in the camera or as an external unit connectable to the camera.

The camera objective 10 optionally has a data store 32 in which objective identification data are stored. These objective identification data can be supplied by means of a control device 33 to the image memory 30 and can be stored together with the respective image data of the sensors 26a, 26b and signal processing units 28a, 28b as a combined data record. It is thereby possible, on a later evaluation of the images, clearly to reproduce with which camera objective and with which objective settings (e.g. focusing value, focal length or aperture) these images were generated. These objective identification data can in particular include such data which allow an identification of the mask 18 used in the camera objective 10. In this respect, it can be a mask identification code, but also an image of the mask. To determine the focusing values, the camera objective 10 optionally has a corresponding measuring device (not shown) by means of which e.g. the position of a focus scale ring can be read out. The focusing value can either be directly output or buffered in the data store 32. The image data stored in the image memory 30 can be transmitted to an evaluation unit 34 which is, as shown here, designed as an external unit. The evaluation unit 34 is designed to determine depth information from the infrared images generated by the sensor 26b according to the initially mentioned method described in detail in the paper by Levin et al. and to associate this depth information with the associated visual images generated by the sensor 26a. The required information on the mask structure can be acquired either from mask structure information stored in the evaluation unit 34, in particular from images of different masks, which can be associated by means of the mask identification code stored with the image data or the information on the mask structure is acquired directly from images of the mask stored together with the image data.

It is generally also possible to integrate the evaluation unit 34 into the camera system. In both cases, the evaluation of the image data can take place simultaneously with their taking or with a time offset.

In accordance with a modification of the embodiment of FIG. 3, the beam splitter 24 is not effective in a wavelength selective manner, i.e. the beam splitter 24 allows a portion of the radiation to pass through to the sensor 26a and reflects another portion of the radiation in the direction of the sensor 26b substantially independently of the wavelength of the radiation passing through the camera objective 10. The beam splitter 24 can in particular be designed for this purpose as a partially permeable mirror or beam splitter cube. In this modification, a suitable filtering takes place with respect to the direction of incidence of the radiation after the beam splitter 24, for example by an infrared blocking filter (i.e. a short pass filter) in front of or at the sensor 26a and/or a long pass filter in front of or at the sensor 26b.

Figure 5:
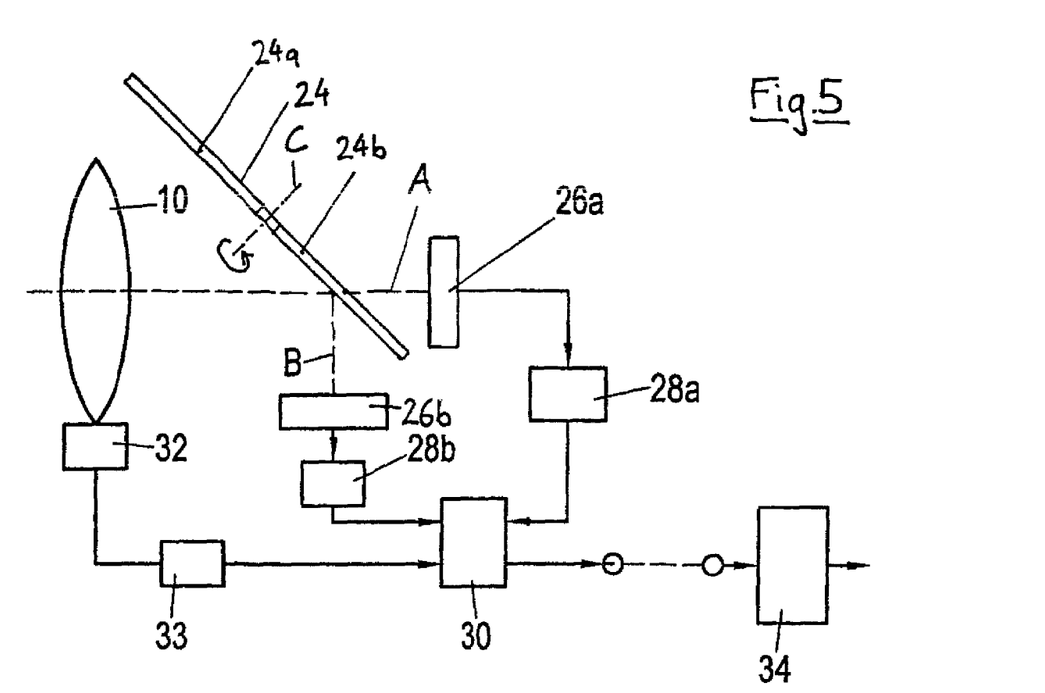
FIG. 5 a camera system in accordance with the invention in accordance with a second embodiment.

In accordance with a further modification of the embodiment of FIG. 3, instead of a beam splitter mirror as a beam splitter 24 which is active in accordance with the time multiplex principle, a rotating mirror shutter can be provided in the beam path. Such a mirror shutter rotates bout an axis C inclined, for example, by 45° to the optical axis A, as is shown in FIG. 5. Such a rotating mirror shutter has one or more radiation-permeable sectors 24a (e.g. with a respective opening), whereas the other sector or sectors 24b are made as reflective. Such a mirror shutter is known from DE 102 10 327 A1 to enable an optical viewfinder with an electronic motion picture camera.

Such a rotating mirror shutter can also be effective for the two spectral ranges in the same manner. The total radiation transmitted by the camera objective 10 is then incident alternately onto either the sensor 26a or the sensor 26b in dependence on the angular position of the rotating mirror shutter. The structure of the sensors 26a and 26b can in particular again correspond to that in accordance with FIG. 4. In this respect, the sensor 26 can, for example, be provided with a filter which only allows the infrared radiation to pass (long pass filter) and/or the sensor 26a is provided, in addition to the Bayer color filter pattern shown in FIG. 4, with a filter which only allows visible light to pass (short pass filter). Alternatively or additionally to this, a spectral separation can be provided by a different inherent spectral sensitivity of the sensors 26a, 26b used.

The operation explained in connection with the first embodiment in accordance with FIG. 3 (with signal processing units 28a, 28b, image memory 30, optional data memory 32 and control device 33, external or internal evaluation unit 34) also applies to the second embodiment in accordance with FIG. 5.

An advantage of the second embodiment in accordance with FIG. 5 (with a rotating mirror shutter) over the first embodiment in accordance with FIG. 3 (with a beam splitter mirror) is that both sensors 26a, 26b receive a maximum radiation quantity (intensity) of the respective spectral range at the time of the respective radiation application. It can furthermore be achieved that the received signals of the sensor 26a for the visible light do not suffer any impairment in the event of a contamination of the beam splitter 24, namely when the sectors 24a of the rotating mirror shutter associated with this sensor 26a are made as openings. In other words, no object is located in the beam path between the camera lens 10 and the sensor 26a at the time of the application of light to the sensor 26a. A particularly simple design results provided that the rotating mirror shutter is not active in a wavelength selective manner. It is, however, also possible within the framework of the invention that the rotating mirror shutter has, in accordance with the beam splitter 24 in accordance with FIG. 3, a spectrally different transmission capacity and reflection capacity.

Figure 6:
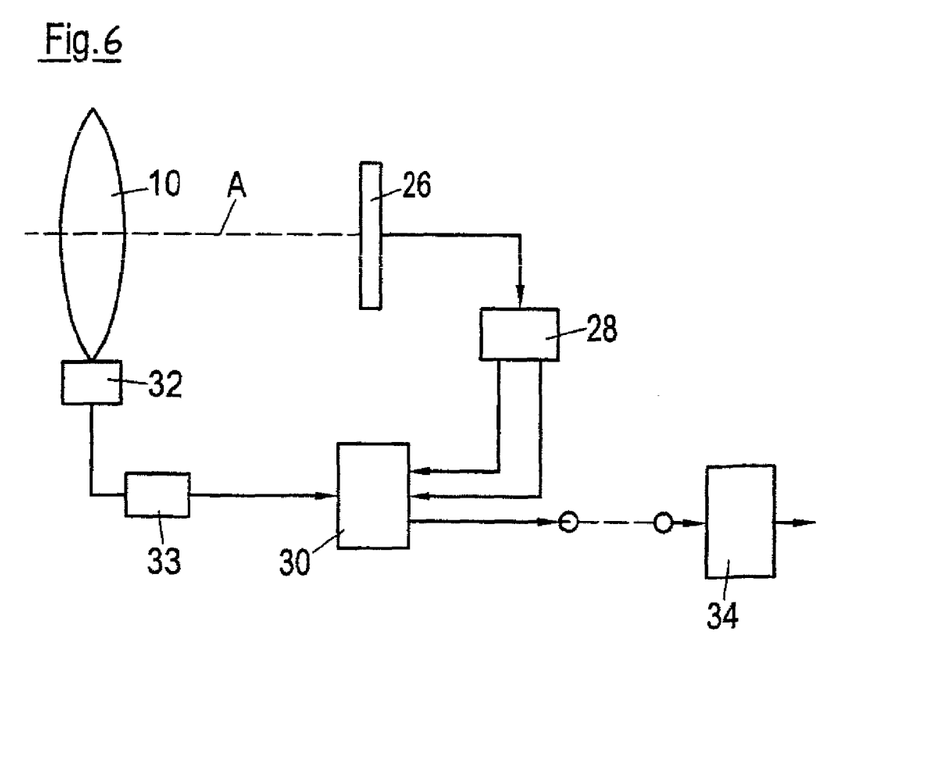
FIG. 6 a camera system in accordance with the invention in accordance with a third embodiment.

A camera system in accordance with a third embodiment includes, in accordance with FIG. 6, a camera objective 10 in accordance with the invention which preferably likewise has a data memory 32. A single sensor 26 is arranged on the optical axis A behind the camera objective 10 and has a plurality of sensor elements which are sensitive either in the visual spectral range or in the infrared spectral range.

Figure 7:
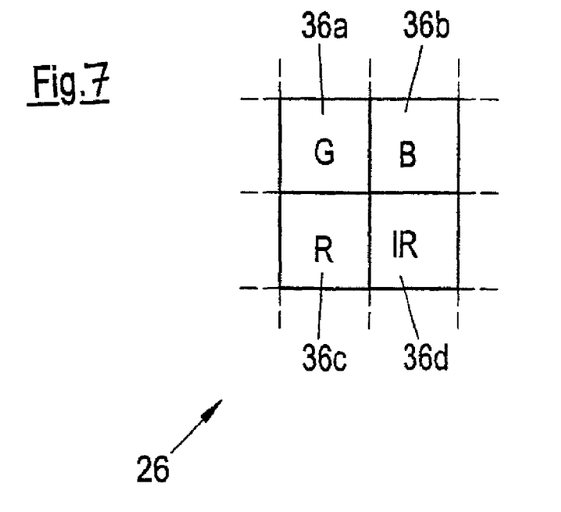
FIG. 7 a section of a schematic representation of a sensor of the camera system in accordance with the third embodiment.

A part section of the sensor 26 is shown in FIG. 7. A matrix of 2×2 sensor elements 36a to 36d is repeated periodically over the surface of the sensor 26. Respective different filters are applied to the sensor elements 36a to 36c so that the sensor element 36a is sensitive for green light, the sensor element 36b for blue light and the sensor element 36c for red light. A fourth sensor element 36d is only sensitive for infrared radiation.

In accordance with FIG. 6, the received signals generated by the sensor 26 are transmitted to a signal processing unit 28 in which the received signals are inter alia digitized. The signal processing unit 28 can furthermore be designed to generate a respective visual image from the received signals generated by the sensor elements 36a to 36c, whereas a respective infrared image is generated from the received signals of the sensor elements 36d. Corresponding (interpolation) methods are generally known for such sensors of the Bayer type.

Both image data records (visible and infrared) are transmitted to the image memory 30 and are linked in the manner described above with respect to FIG. 3 to the objective identification data stored in the data memory 32. The evaluation in the evaluation unit 34 also takes place in the manner described with reference to FIG. 3.

A camera system in accordance with the invention in accordance with one of the named embodiments simultaneously allows an image to be generated in the visual spectral region using a single camera objective 10 in which a code aperture formed as a mask 18 is provided, said image being substantially uninfluenced by the mask 18 and therefore not having any esthetically disadvantageous artifacts and to take an image coded by the mask 18 in the infrared spectral range and to determine from this by means of suitable processes depth information for generating a depth map which is congruent or coextensive with the visual image. Since only one objective is used, the measuring range for generating the depth map automatically adapts to the observed image region with respect to the image angle and/or the distance when the focus of the objective is changed or, with a zoom objective, when the focal length is changed or when the objective itself is changed. Parallax errors are avoided.

Optionally, a structured infrared lighting can be provided by means of which a dot pattern or line pattern is projected onto the scene to be taken. In contrast to the initially mentioned triangulation process, the base distance between the infrared lighting and the camera does not have to be known. Due to the structured lighting, mainly the degree of texturing of the objects to be taken is increased, which in turn improves the accuracy of the depth information acquired by means of deconvolution. In a corresponding manner, an apparatus can be provided for the generation of structured ultraviolet lighting.

To increase the intensity of illumination in the infrared range or in the ultraviolet range, alternatively or additionally, a non-structured infrared lighting or ultraviolet lighting can also be provided.

The invention claimed is:

1. A camera objective, having a mask (18) with a plurality of masking sections (20) which are permeable for radiation of a first spectral range and are impermeable for radiation of a second spectral range different from the first spectral range,
    wherein the first spectral range is formed by at least one spectral range of visible radiation, and wherein the second spectral range is formed by at least one spectral range of non-visible radiation,
    wherein the camera objective (10) comprises two main planes, and wherein the mask (18) is arranged between the two main planes of the camera objective (10),
    wherein the camera objective (10) comprises a diaphragm (16), and wherein the mask (18) is arranged within the diaphragm (16) of the camera objective (10) or directly adjacent to the diaphragm (16) of the camera objective (10),
    wherein the mask (18) has passage sections (22) which are complementary to the masking sections (20) and which are permeable both for radiation of the first spectral range and for radiation of the second spectral range, and
    wherein the camera objective (10) is adapted to output a focusing value set at the camera objective (10).

2. A camera objective in accordance with claim 1, wherein the second spectral range is formed by infrared or ultraviolet radiation.

3. A camera objective in accordance with claim 1,
    wherein the masking sections (20) are made self-supporting.

4. A camera objective in accordance with claim 1,
    wherein the masking sections (20) are formed on a carrier.

5. A camera objective in accordance with claim 1,
    wherein the masking sections (20) are arranged in a structured manner.

6. A camera objective in accordance with claim 1, wherein the first spectral range is formed by at least one spectral range of visible radiation, and wherein the second spectral range is formed by at least one spectral range of non-visible radiation.

7. A camera objective in accordance with claim 1,
    wherein a data memory (32) is associated with the camera objective (10) and is adapted to store data characterizing the mask (18).

* * * * *